United States Patent
Oku et al.

(10) Patent No.: US 8,992,062 B2
(45) Date of Patent: Mar. 31, 2015

(54) DISPLAY DEVICE WITH LIGHT GUIDE PLATE HAVING IRREGULARITIES ON FRONT LIGHT EXIT SURFACE

(75) Inventors: Kentaro Oku, Mobara (JP); Yasuhisa Shiraishi, Mobara (JP); Masao Uehara, Mobara (JP); Akiyoshi Tobe, Mobara (JP); Takashi Kuwabara, Isumi (JP)

(73) Assignee: Japan Display Inc., Tokyo (JP)

(*) Notice: Subject to any disclaimer, the term of this patent is extended or adjusted under 35 U.S.C. 154(b) by 388 days.

(21) Appl. No.: 13/359,512

(22) Filed: Jan. 27, 2012

(65) Prior Publication Data

US 2012/0195064 A1 Aug. 2, 2012

(30) Foreign Application Priority Data

Feb. 2, 2011 (JP) ................................. 2011-020364
Jun. 16, 2011 (JP) ................................. 2011-133944

(51) Int. Cl.
*F21V 7/04* (2006.01)
*F21V 8/00* (2006.01)

(52) U.S. Cl.
CPC ............ *G02B 6/0038* (2013.01); *G02B 6/0055* (2013.01)
USPC ....................................................... 362/602

(58) Field of Classification Search
None
See application file for complete search history.

(56) References Cited

U.S. PATENT DOCUMENTS

| 6,123,431 A | 9/2000 | Teragaki et al. |
| 2008/0025687 A1 | 1/2008 | Lee et al. |
| 2009/0284688 A1 | 11/2009 | Shiraishi et al. |

FOREIGN PATENT DOCUMENTS

| CN | 101101097 | 1/2008 |
| JP | 11-24586 | 1/1999 |
| JP | 2009-276531 | 11/2009 |
| TW | 200612158 | 4/2006 |
| WO | WO 2009/085543 | 7/2009 |
| WO | WO 2011/093173 | 8/2011 |

OTHER PUBLICATIONS

Partial English translation of Office Action in corresponding Chinese Patent Application No. 201210025063.3, dated Mar. 27, 2014.
Partial Translation of Taiwanese Patent Application No. 101101128, dialed Jul. 29, 2014.

*Primary Examiner* — Britt D Hanley
(74) *Attorney, Agent, or Firm* — Lowe Hauptman & Ham, LLP

(57) ABSTRACT

Provided is a display device including: a light guide plate arranged so that an edge surface thereof is opposed to a light source, the light guide plate being configured to internally reflect light entering from the edge surface to cause planar light emission from a front surface of the light guide plate; and a reflective sheet arranged so as to be opposed to a rear surface of the light guide plate. Irregularities are formed on the front surface. The irregularities are formed to have a shape of a combination of first convex portions and second convex portions, each of the first convex portions including a first ridge line which continuously extends along a first direction corresponding to a light traveling direction, each of the second convex portions including a second ridge line which continuously extends along a second direction intersecting the first direction.

20 Claims, 9 Drawing Sheets

DISPLAY DEVICE WITH LIGHT GUIDE PLATE HAVING IRREGULARITIES ON FRONT LIGHT EXIT SURFACE

CROSS-REFERENCE TO RELATED APPLICATION

The present application claims priorities from Japanese applications JP 2011-020364 filed on Feb. 2, 2011 and JP 2011-133944 filed on Jun. 16, 2011, the contents of which are hereby incorporated by reference into those applications.

BACKGROUND OF THE INVENTION

1. Field of the Invention

The present invention relates to a display device.

2. Description of the Related Art

In a liquid crystal display device including an edge-lit backlight unit, light entering an edge surface of a light guide plate travels inside the light guide plate, and is reflected at an interface on a rear surface side of the light guide plate to exit from a front surface thereof (see Japanese Patent Application Laid-open No. 2009-276531). Specifically, on the rear surface side, mountain-like convex portions or valley-like concave portions are formed so that ridge lines thereof extend in a direction orthogonal to the traveling direction of light. Light reflected by the convex portions or the concave portions exits from the front surface. Further, there is also light returning inside by being reflected at an interface on the front surface side. In order to cause convergence of this light, on the front surface side, mountain-like convex portions or valley-like concave portions are formed so that ridge lines thereof extend in a direction parallel to the traveling direction of light.

Light traveling inside the light guide plate includes light to be reflected at the interface on the rear surface side, and in addition, light that passes through the rear surface. In order to return the light that has passed through the rear surface to the light guide plate, a reflective sheet is arranged. In recent years, there is a case where a reflective sheet having high reflectance ratio is used. However, because the reflective sheet can be brought into intimate contact with the light guide plate, there arises a problem that light that is supposed to be reflected at the interface on the rear surface of the light guide plate is absorbed in the reflective sheet. As a countermeasure against this problem, it is conceivable to reduce the degree of intimate contact by roughing the rear surface of the light guide plate by blasting. However, in this case, the shapes of the convex portions or the concave portions on the rear surface are changed, and hence the brightness distribution is changed.

SUMMARY OF THE INVENTION

The present invention has an object to provide a display device including a light guide plate, which is capable of causing light to exit efficiently while causing light convergence, regardless of a change in brightness distribution due to an intimate contact with respect to a reflective sheet.

(1) A display device according to an exemplary embodiment of the present invention includes: a light source; a light guide plate including a front surface, a rear surface on a side opposite to the front surface, and an edge surface connecting the front surface and the rear surface to each other, the light guide plate being arranged so that the edge surface is opposed to the light source, the light guide plate being configured to internally reflect light entering from the edge surface to cause planar light emission from the front surface; a light shutter type display panel, which is arranged so as to be opposed to the front surface of the light guide plate, and in which passing and blocking of the light exiting from the front surface of the light guide plate is controlled to display an image; and a reflective sheet arranged so as to be opposed to the rear surface of the light guide plate. The front surface has irregularities formed thereon. The irregularities are formed to have a shape of a combination of a plurality of first convex portions and a plurality of second convex portions, each of the plurality of first convex portions including a first ridge line which continuously extends along a first direction corresponding to a traveling direction of the light, each of the plurality of second convex portions including a second ridge line which continuously extends along a second direction intersecting the first direction. According to the present invention, the irregularities are formed on the front surface from which light exits, and hence it is possible to cause light to exit efficiently while causing light convergence, regardless of the change in brightness distribution due to the intimate contact between the rear surface and the reflective sheet.

(2) In the display device according to the above-mentioned item (1), the each of the plurality of second convex portions may include a pair of second side surfaces, which are inclined from the second ridge line in directions opposite to each other, and one second side surface of the pair of second side surfaces, which is located on a side on which the light enters, and another second side surface thereof, which is located on a side opposite to the one second side surface, may be formed so that the another second side surface is inclined at an angle smaller than an angle of the one second side surface.

(3) In the display device according to the above-mentioned item (1) or (2), regions surrounded by the plurality of first convex portions and the plurality of second convex portions may be flat.

(4) A display device according to another exemplary embodiment of the present invention includes: a light source; a light guide plate including a front surface, a rear surface on a side opposite to the front surface, and an edge surface connecting the front surface and the rear surface to each other, the light guide plate being arranged so that the edge surface is opposed to the light source, the light guide plate being configured to internally reflect light entering from the edge surface to cause planar light emission from the front surface; a light shutter type display panel, which is arranged so as to be opposed to the front surface of the light guide plate, and in which passing and blocking of the light exiting from the front surface of the light guide plate is controlled to display an image; and a reflective sheet arranged so as to be opposed to the rear surface of the light guide plate. The front surface has irregularities formed thereon. The irregularities are formed to have a shape of a combination of a plurality of first concave portions and a plurality of second concave portions, each of the plurality of first concave portions including a first valley line which continuously extends along a first direction corresponding to a traveling direction of the light, each of the plurality of second concave portions including a second valley line which continuously extends along a second direction intersecting the first direction. According to the present invention, the irregularities are formed on the front surface from which light exits, and hence it is possible to cause light to exit efficiently while causing light convergence, regardless of the change in brightness distribution due to the intimate contact between the rear surface and the reflective sheet.

(5) In the display device according to the above-mentioned item (4), the each of the plurality of second concave portions may include a pair of second side surfaces, which are inclined from the second valley line in directions opposite to each other, and one second side surface of the pair of second side surfaces, which is located on a side on which the light enters, and another second side surface thereof, which is located on a side opposite to the one second side surface, may be formed so that the one second side surface is inclined at an angle smaller than an angle of the another second side surface.

(6) In the display device according to the above-mentioned item (4) or (5), regions surrounded by the plurality of first concave portions and the plurality of second concave portions may be flat.

(7) In the display device according to any one of the above-mentioned items (1) to (6), the reflective sheet may include an enhanced specular reflector.

(8) In the display device according to the above-mentioned item (7), the rear surface of the light guide plate may include a rough surface.

(9) In the display device according to any one of the above-mentioned items (1) to (8), the rear surface may include a plurality of third convex portions each including a third ridge line which continuously extends along the first direction, and each of the plurality of third convex portions may include a pair of third side surfaces provided across the third ridge line.

(10) In the display device according to any one of the above-mentioned items (1) to (8), the rear surface may include a plurality of third concave portions each extending along the first direction.

DETAILED DESCRIPTION OF THE INVENTION

Figure 1:
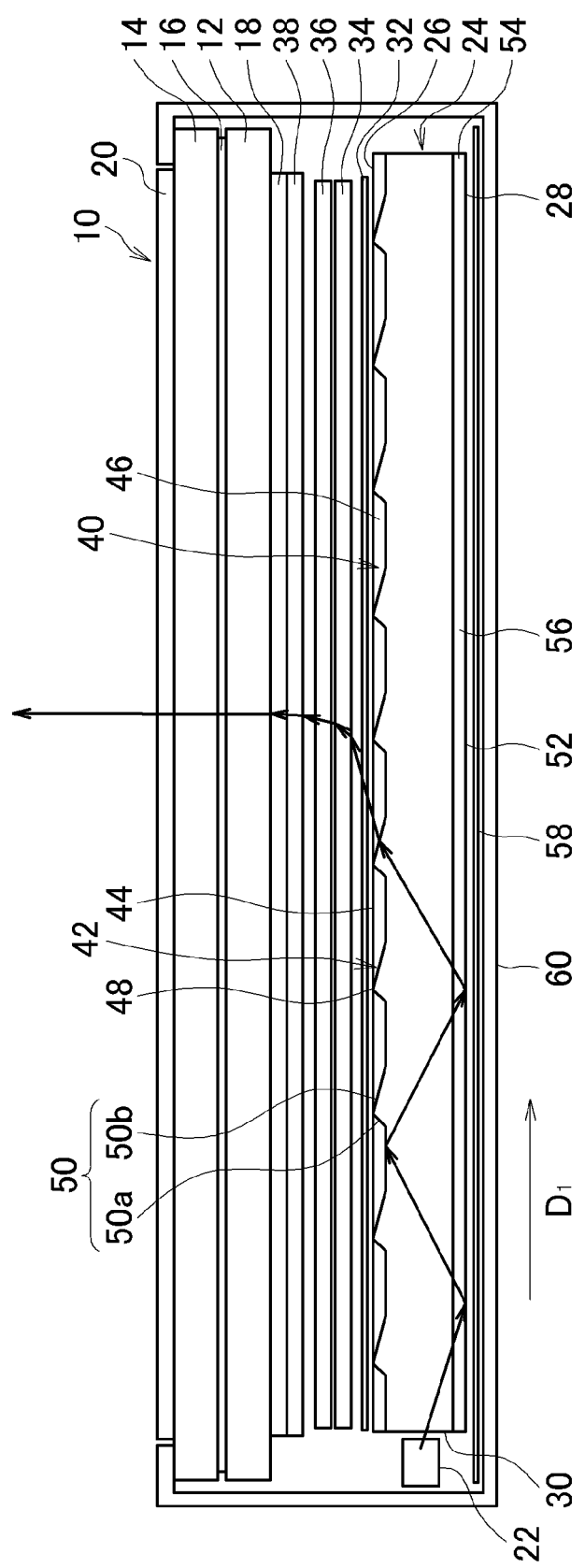
FIG. 1 is a sectional view illustrating a display device according to an embodiment of the present invention.

Hereinafter, an embodiment of the present invention is described with reference to the drawings. FIG. 1 is a sectional view illustrating a display device according to the embodiment of the present invention.

The display device includes a display panel 10. The display panel 10 is a light shutter type display panel in which passing and blocking of light is controlled to display an image. The display panel 10 illustrated in FIG. 1 is a liquid crystal display panel. The display panel 10 includes a pair of substrates 12 and 14 each made of, for example, glass, a liquid crystal layer 16 sandwiched therebetween, and polarizing plates 18 and 20 respectively provided on outer sides of the pair of substrates 12 and 14.

The display device includes a light source 22. The light source 22 is a point light source such as a light emitting diode (LED) or a linear light source.

The display device includes a light guide plate 24. The light guide plate 24 includes a front surface 26 and a rear surface 28 on a side opposite to the front surface 26, and further an edge surface 30 connecting the front surface 26 and the rear surface 28 to each other. The light guide plate 24 is arranged so that the edge surface 30 is opposed to the light source 22. Light emitted from the light source 22 enters the light guide plate 24 from the edge surface 30, and even inside the light guide plate 24, travels in a direction from the light source 22 toward the edge surface 30 (hereinafter, referred to as "light traveling direction"). The light guide plate 24 is configured to internally reflect light entering from the edge surface 30 to cause planar light emission from the front surface 26. The light guide plate 24 converts the point light source or the linear light source into a planar light source. The light guide plate 24 is arranged so that the front surface 26 thereof is opposed to the display panel 10. Therefore, light exiting from the front surface 26 of the light guide plate 24 travels toward the display panel 10.

Above the light guide plate 24 (on aside close to the display panel 10), a light diffusion sheet 32 is arranged. The light diffusion sheet 32 has a weak light diffusion action, and hence when light passes through the light diffusion sheet 32, influence on light distribution can be reduced. Above the light diffusion sheet 32 (on a side close to the display panel 10), two prism sheets 34 and 36 are arranged. When light passes through the prism sheets 34 and 36, light can be collected toward a front side of the display panel 10 to improve the front brightness. Further, above the prism sheets 34 and 36 (on a side close to the display panel 10), a film 38 for performing conversion of polarized light is arranged, thereby increasing light components including polarized light oscillating in a light transmission axis direction of the polarizing plate 18.

Figure 2:
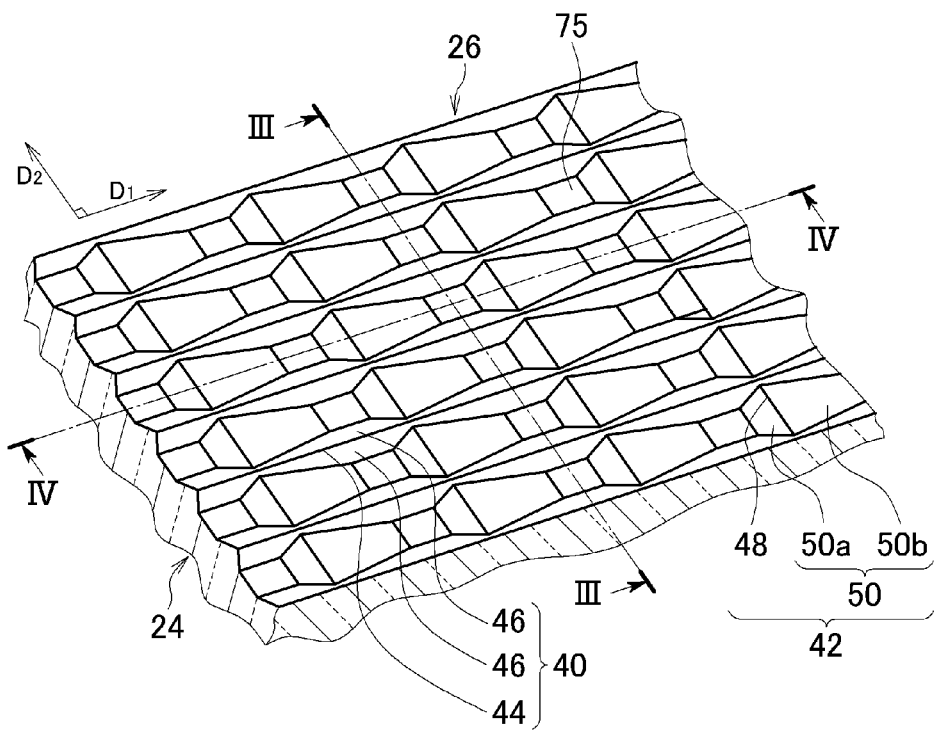
FIG. 2 is a perspective view illustrating a part of a front surface (surface on a display panel side) of a light guide plate.
Figure 3:
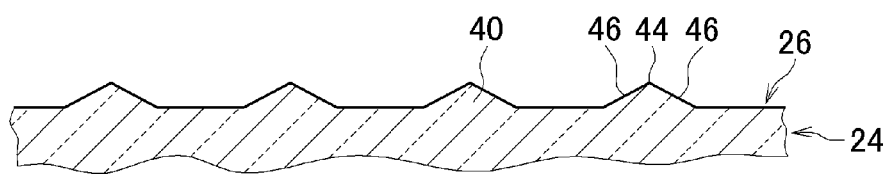
FIG. 3 is a sectional view taken along the line III-III of the light guide plate illustrated in FIG. 2.
Figure 4:
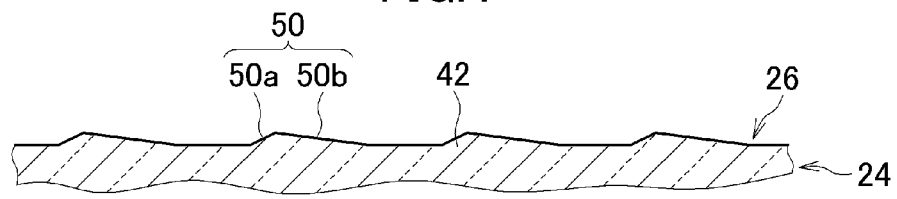
FIG. 4 is a sectional view taken along the line IV-IV of the light guide plate illustrated in FIG. 2.

FIG. 2 is a perspective view illustrating a part of the front surface 26 (surface on the display panel 10 side) of the light guide plate 24. FIG. 3 is a sectional view taken along the line III-III of the light guide plate 24 illustrated in FIG. 2. FIG. 4 is a sectional view taken along the line IV-IV of the light guide plate 24 illustrated in FIG. 2.

On the front surface 26 of the light guide plate 24, irregularities are formed. The irregularities are formed to have a shape of a combination of a plurality of first convex portions 40 (vertically projected portions) and a plurality of second convex portions 42 (laterally projected portions). Regions surrounded by the plurality of first convex portions 40 and the plurality of second convex portions 42 are flat.

The first convex portion 40 includes a first ridge line 44 which continuously extends along a first direction $D_1$ corresponding to the light traveling direction. The first convex portion 40 includes a pair of first side surfaces 46, which are inclined from the first ridge line 44 in directions opposite to each other. The first side surface 46 may be a flat surface, or may be a convex curve surface or a concave curve surface. Through the formation of the first convex portions 40, light divergence can be suppressed. A pitch between the first ridge lines 44 of the adjacent first convex portions 40 is ⅓ of a pixel pitch of the display panel 10. In the figures, the first convex portion 40 is larger in height than the second convex portion 42, and is formed so that the first ridge line 44 is continuous. However, the first convex portion 40 is not required to be formed in this way across the entire surface.

The second convex portion 42 includes a second ridge line 48 which continuously extends along a second direction $D_2$ intersecting the first direction $D_1$ (light traveling direction). A pitch between the second ridge lines 48 of the adjacent second convex portions 42 is designed to be equal to the pixel pitch of the display panel 10. Further, the height of the second convex portion 42 is adjusted so that the distribution of light exiting from the light guide plate 24 becomes uniform. Therefore, when the pixel pitch is too small, the height of the second convex portion 42 may be very small in some locations, which is not easily obtained by molding. In this case, the pitch between the second ridge lines 48 of the adjacent second convex portions 42 may be about two times as large as the pixel pitch. Note that, when the exiting light distribution is adjusted as described above, unlike the figures, there may be formed locations in which the first convex portion 40 is smaller in height than the second convex portion 42 and the first ridge line 44 is interrupted.

In the figures, the second convex portion 42 is formed between the adjacent first convex portions 40 so that the second ridge line 48 is interrupted by a top portion of the first convex portion 40. However, due to the exiting light distribution adjustment, the second ridge line 48 is formed continuously in some locations. The second convex portion 42 includes a pair of second side surfaces 50, which are inclined from the second ridge line 48 in directions opposite to each other. The second side surface 50 may be a flat surface, or may be a convex curve surface or a concave curve surface. One second side surface 50a of the second side surfaces 50, which is located on a side on which the light enters (see FIG. 1), and another second side surface 50b thereof, which is located on a side opposite to the one second side surface 50a, are formed so that the another second side surface 50b is inclined at an angle smaller than that of the one second side surface 50a. With this, the another second side surface 50b which is inclined at a smaller angle is larger in size (wider) than the one second side surface 50a on the light entering side.

The second convex portion 42 has a convex shape in which the second ridge line 48 extends in a direction intersecting (for example, orthogonal to) the light traveling direction. Therefore, light traveling inside the light guide plate 24 is liable to be totally reflected at the one second side surface 50a, and is liable to pass through the light guide plate 24 at the another second side surface 50b. Specifically, the one second side surface 50a located on a side close to the light source 22 with respect to the second ridge line 48 forms a shallow (small) angle with the entering light, and hence light is liable to be totally reflected. On the other hand, the another second side surface 50b located on a side far from the light source 22 with respect to the second ridge line 48 forms a steep (large) angle with the entering light, and hence light is liable to pass through the light guide plate 24. Therefore, the another second side surface 50b, at which light is liable to pass through the light guide plate 24, is increased in size so as to increase the light amount exiting from the light guide plate 24.

Figure 5:
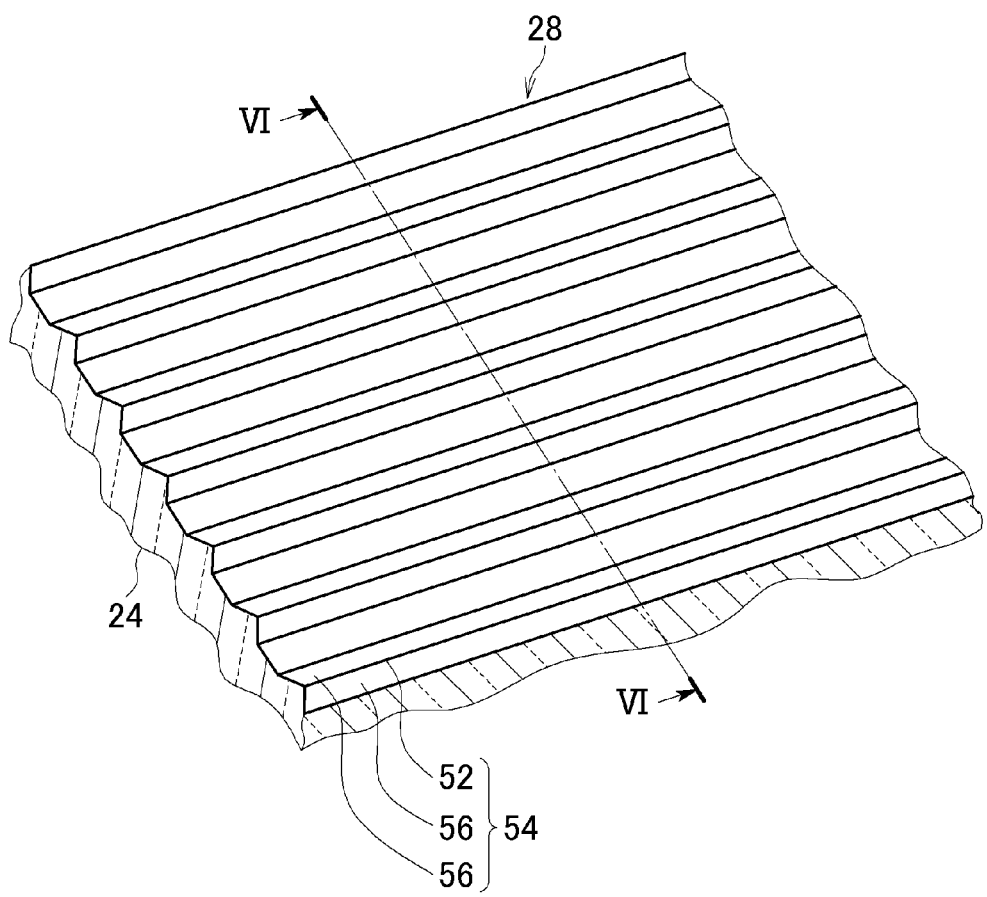
FIG. 5 is a perspective view illustrating a rear surface (surface on a side opposite to the display panel) of the light guide plate.
Figure 6:
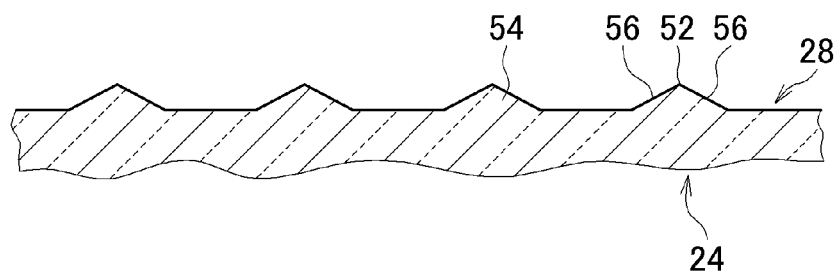
FIG. 6 is a sectional view taken along the line VI-VI of the rear surface of the light guide plate illustrated in FIG. 5.

FIG. 5 is a perspective view illustrating the rear surface 28 (surface on a side opposite to the display panel 10) of the light guide plate 24. FIG. 6 is a sectional view taken along the line VI-VI of the rear surface 28 of the light guide plate 24 illustrated in FIG. 5. The rear surface 28 includes a plurality of third convex portions 54 formed thereon, each including a third ridge line 52 which continuously extends along the first direction $D_1$ (light traveling direction). Each of the third convex portions 54 includes a pair of third side surfaces 56 provided across the third ridge line 52.

The display device includes a reflective sheet 58 arranged so as to be opposed to the rear surface 28 of the light guide plate 24. The reflective sheet 58 illustrated in FIG. 1 is an enhanced specular reflector (ESR). The ESR employs a multi-layer structure made of a polyester resin, and possesses a high reflectance ratio of about 98% in the visible light range. The ESR contributes to improvement in brightness. Note that, the ESR has a front surface which is a smooth mirror surface, and hence is liable to be brought into intimate contact with the rear surface 28 of the light guide plate 24.

According to this embodiment, the irregularities are formed on the front surface 26 from which light exits, and hence it is possible to cause light to exit efficiently while causing light convergence, regardless of the change in brightness distribution due to the intimate contact between the rear surface 28 and the reflective sheet 58.

In this embodiment, the rear surface 28 of the light guide plate 24 is a rough surface. A mold to be used when forming the light guide plate 24 by injection-molding is subjected to blasting of spraying iron balls having a grain diameter of several micrometers to the mold. In this manner, many small granular protrusions can be provided on the rear surface 28 of the light guide plate 24. Through the formation of the rear surface 28 of the light guide plate 24 as a rough surface, the degree of intimate contact between the rear surface 28 and the reflective sheet 58 can be reduced. In this case, the rear surface 28 is a rough surface, and hence brightness distribution changes due to light that travels inside the light guide plate 24 and is reflected to return at the interface of the rear surface 28. However, according to this embodiment, light divergence is suppressed by the first convex portion 40 formed on the side on which the light exits. Therefore, it is unnecessary to adjust the brightness distribution.

A backlight unit is constructed of the above-mentioned light guide plate 24, light source 22, reflective sheet 58, and the like. The backlight unit and the display panel 10 are housed in a frame 60.

Figure 7:
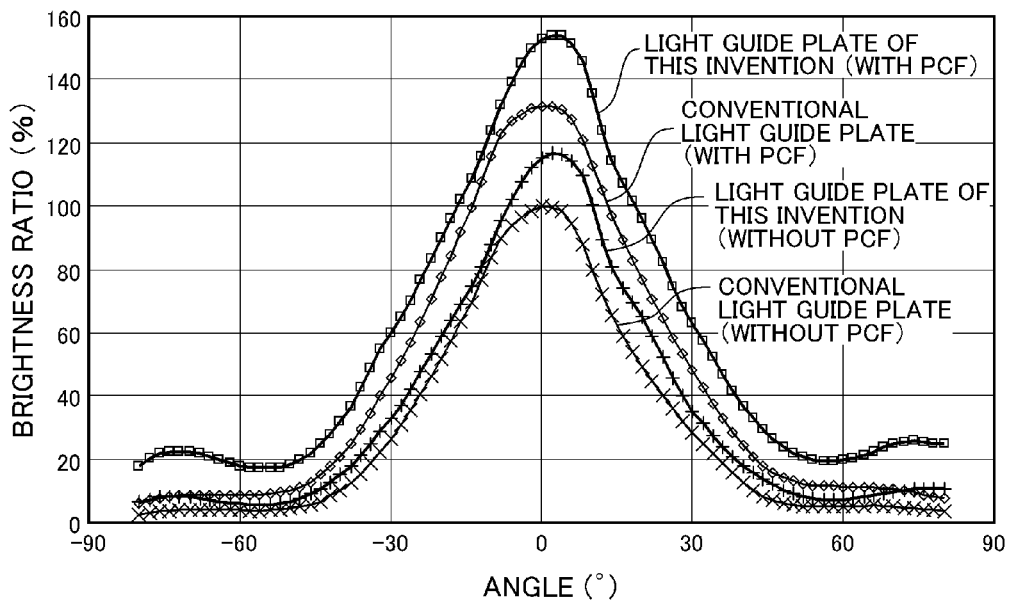
FIG. 7 is a graph illustrating a dependency of brightness distribution with respect to a polar angle (shift from a perpendicular direction) in a light traveling direction, of a backlight unit having a structure using a conventional light guide plate and a backlight unit having a structure using the light guide plate according to the present invention.
Figure 8:
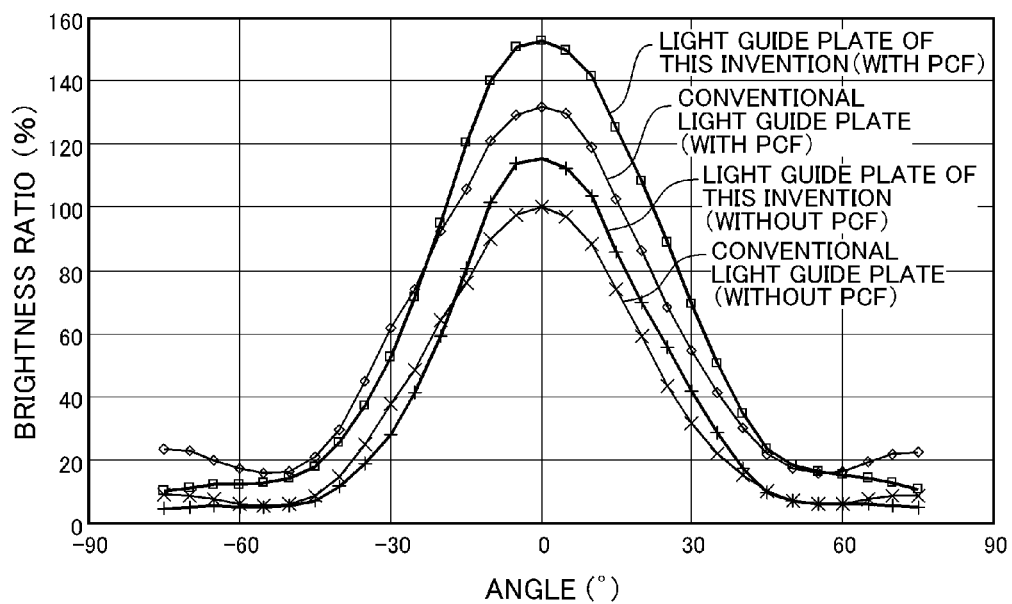
FIG. 8 is a graph illustrating a dependency of the brightness distribution with respect to the polar angle (shift from the perpendicular direction) in a direction perpendicular to the light traveling direction, of the backlight unit having a structure using the conventional light guide plate and the backlight unit having a structure using the light guide plate according to the present invention.

FIGS. 7 and 8 are graphs each illustrating a dependency of the brightness distribution with respect to a polar angle (shift from a perpendicular direction), of a backlight unit having a structure using a conventional light guide plate and the backlight unit having a structure using the light guide plate 24 according to the present invention. FIG. 7 illustrates measurement results of brightness with respect to the polar angle in the light traveling direction, and FIG. 8 illustrates measurement results of brightness with respect to the polar angle in a direction perpendicular to the light traveling direction. The backlight unit includes the lower polarizing plate, and comparison is made in both cases of providing and not providing, to the backlight unit, a film for recycling light polarized in one direction (PCF).

From the measurement results, it is understood that, through the employment of the light guide plate 24 of the present invention, compared to the case where the conventional light guide plate is used, the brightness at the polar angle of 0° is improved by about 15% in both cases of providing and not providing the PCF. Therefore, it is understood that a sufficient improvement in brightness is obtained.

Figure 9:
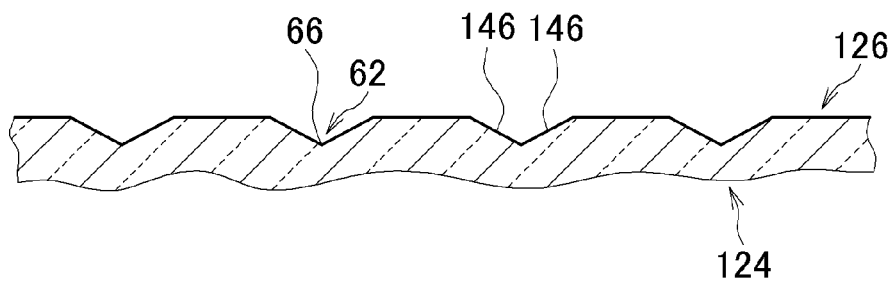
FIG. 9 is a view illustrating a modified example of the front surface of the light guide plate illustrated in FIG. 3.
Figure 10:
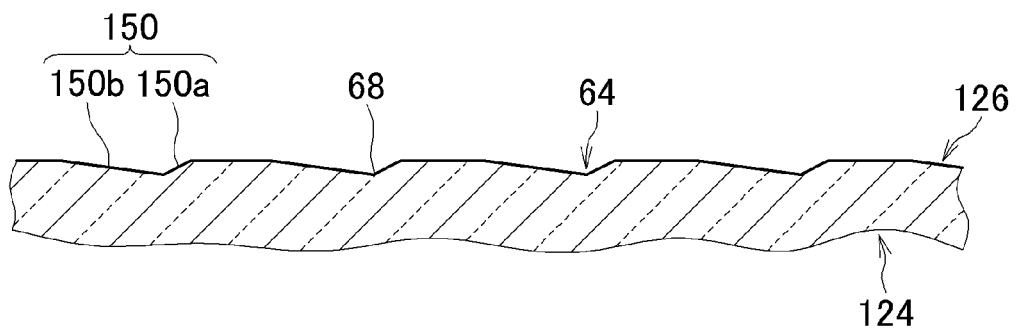
FIG. 10 is a view illustrating the modified example of the front surface of the light guide plate illustrated in FIG. 4.

FIGS. 9 and 10 are sectional views illustrating a modified example of the light guide plate. A light guide plate 124 according to the modified example includes a front surface 126 having a shape in which irregularities illustrated in FIG. 2 are reversed. FIG. 9 illustrates the modified example of the cross section illustrated in FIG. 3, and FIG. 10 illustrates the modified example of the cross section illustrated in FIG. 4.

As illustrated in FIGS. 9 and 10, the irregularities of the light guide plate 124 are formed to have a shape of a combination of a plurality of first concave portions (or first V-shaped grooves) 62 and a plurality of second concave portions (or second V-shaped grooves) 64. The plurality of first concave portions 62 each include a first valley line 66 which continuously extends along the first direction $D_1$ corresponding to the light traveling direction. The plurality of second concave portions 64 each include a second valley line 68 which continuously extends along the second direction $D_2$ intersecting the first direction $D_1$.

The light guide plate 124 according to the modified example is obtained by modifying the shape illustrated in FIG. 2 so as to have cross sections illustrated in FIGS. 9 and 10. In the figures, the first concave portion 62 is formed larger in depth than the second concave portion 64, and is formed so that the first valley line 66 is continuous. However, due to the exiting light distribution adjustment, the first valley line 66 is interrupted in some locations. The second concave portion 64 is formed between the adjacent first concave portions 62 so that the second valley line 68 is interrupted by a bottom portion of the first concave portion 62. Regions surrounded by the plurality of first concave portions 62 and the plurality of second concave portions 64 are flat. The first concave portion 62 includes a pair of first side surfaces 146, which are inclined from the first valley line 66 in directions opposite to each other. The second concave portion 64 includes a pair of second side surfaces 150, which are inclined from the second valley line 68 in directions opposite to each other.

In FIG. 4, the second convex portion 42 is convex, and the wide second side surface 50b having a smaller inclination angle extends from the second ridge line 48 in the light traveling direction (direction separating from the light source 22). In contrast, in FIG. 10, the second concave portion 64 is concave, and hence a wide second side surface 150b having a smaller inclination angle extends from the second valley line 68 in a direction opposite to the light traveling direction (direction approaching the light source 22). That is, one second side surface 150b located on a side on which light enters is inclined at an angle smaller than that of another second side surface 150a on the opposite side, and the one second side surface 150b is larger in size than the another second side surface 150a.

As is understood from the comparison between FIGS. 4 and 10, in both cases where the second convex portion 42 is formed and the second concave portion 64 is formed, the second side surface 50b or 150b inclined at a smaller angle is inclined so that a normal thereof becomes close to the light traveling direction.

Figure 11:
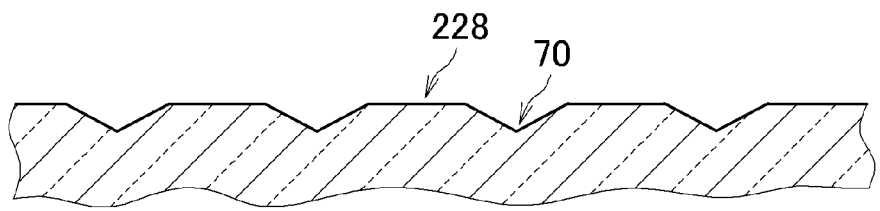
FIG. 11 is a view illustrating a modified example of the rear surface of the light guide plate illustrated in FIG. 6.

Further, as another modified example, the rear surface 28 of the light guide plate 24 illustrated in FIG. 6 may be modified as illustrated in FIG. 11. That is, in the another modified example, a rear surface 228 includes a plurality of third concave portions 70 each extending along the first direction $D_1$ (light traveling direction). Alternatively, as still another modified example (not shown), the rear surface of the light guide plate 24 may be formed flat.

The present invention is not limited to the above-mentioned embodiment, and various modifications may be made thereto. For example, the structure described in the embodiment may be replaced by substantially the same structure, a structure which has the same action and effect, or a structure which can achieve the same object.

Figure 12:
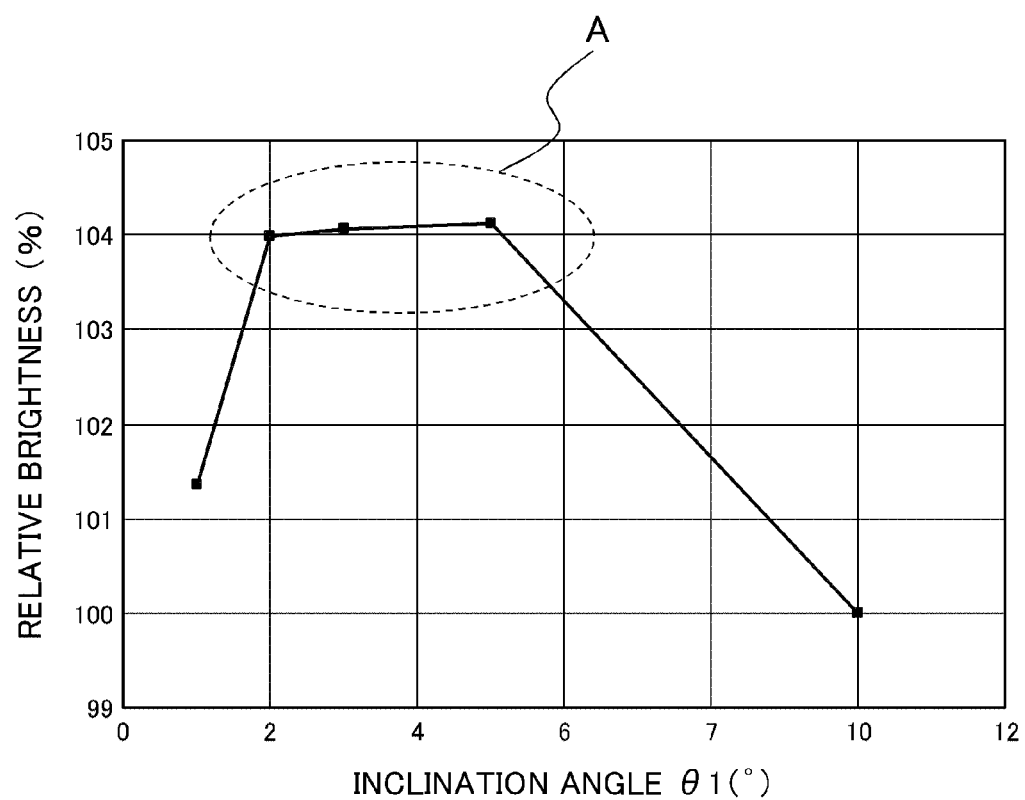
FIG. 12 is a graph illustrating a relationship between brightness and an inclination angle θ1 of an irregularity portion, which is provided perpendicular to a light traveling direction of a light guide plate of an example of the present invention.

Next, experimental results related to angular dependency of brightness are shown in FIG. 12, concerning the inclination angle of the second side surface 50b inclined at a smaller angle at the concave portion or the convex portion (second convex portion 42 in FIG. 2), which is provided perpendicularly to the light traveling direction of the light guide plate.

Figure 13A:
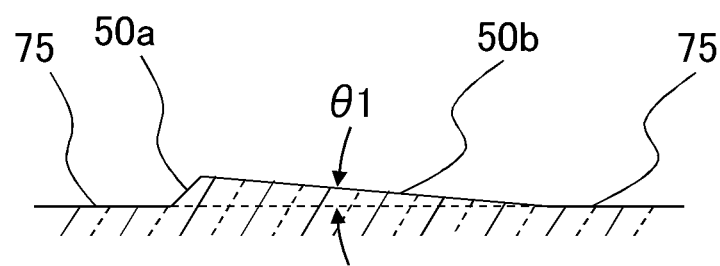
FIGS. 13A and 13B are views each illustrating the inclination angle θ1 of the irregularity portion, which is provided perpendicular to the light traveling direction of the light guide plate of the example.
Figure 13B:
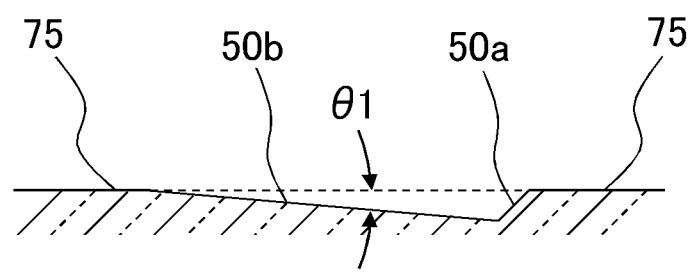

FIG. 13A illustrates an example in which the second side surfaces 50a and 50b form a protrusion, and FIG. 13B illustrates an example in which the second side surfaces 50a and 50b form a recess. Note that, as illustrated in FIGS. 13A and 13B, an inclination angle $\theta 1$ of the second side surface 50b corresponds to an angle of inclination of the second side surface 50b with respect to a flat region 75 illustrated in FIG. 2, which is surrounded by the plurality of first convex portions 40 and the plurality of second convex portions 42.

The conventional backlight unit uses a light guide plate corresponding to the light guide plate of FIG. 2 without the first convex portions 40, which are provided on the front surface and extend along the light traveling direction. The inclination angle $\theta 1$ of the second side surface 50b of the second convex portion 42 in this case was 10°. Therefore, FIG. 12 illustrates a dependency of brightness with respect to the inclination angle $\theta 1$ of an example of the present invention including the first convex portions 40, in which the case where the inclination angle $\theta 1$ is 10° is used as the reference. Specifically, the horizontal axis of FIG. 12 represents the inclination angle $\theta 1$ of the second side surface 50b of the second convex portion 42 (lateral groove), which is provided perpendicular to the light traveling direction, and the vertical axis of FIG. 12 represents the relative brightness (%) with respect to the reference. Note that, inclination angles $\theta 2$ and $\theta 2'$ (see FIGS. 15A and 15B) of the first convex portion 40 (longitudinal groove), which is provided parallel to the light traveling direction, are 30°.

As indicated by a portion surrounded by the broken line A in FIG. 12, the maximum brightness is obtained when the inclination angle $\theta 1$ is in the vicinity of a range from 2° to 5°, and the brightness is stably flat in this range. Further, the brightness is increased by about 4% compared to a case where $\theta 1$ is 10°. Therefore, the preferred range of the inclination angle $\theta 1$ to take advantage of the brightness improvement, which is the feature of this example, is about 2° to 5°.

Figure 14:
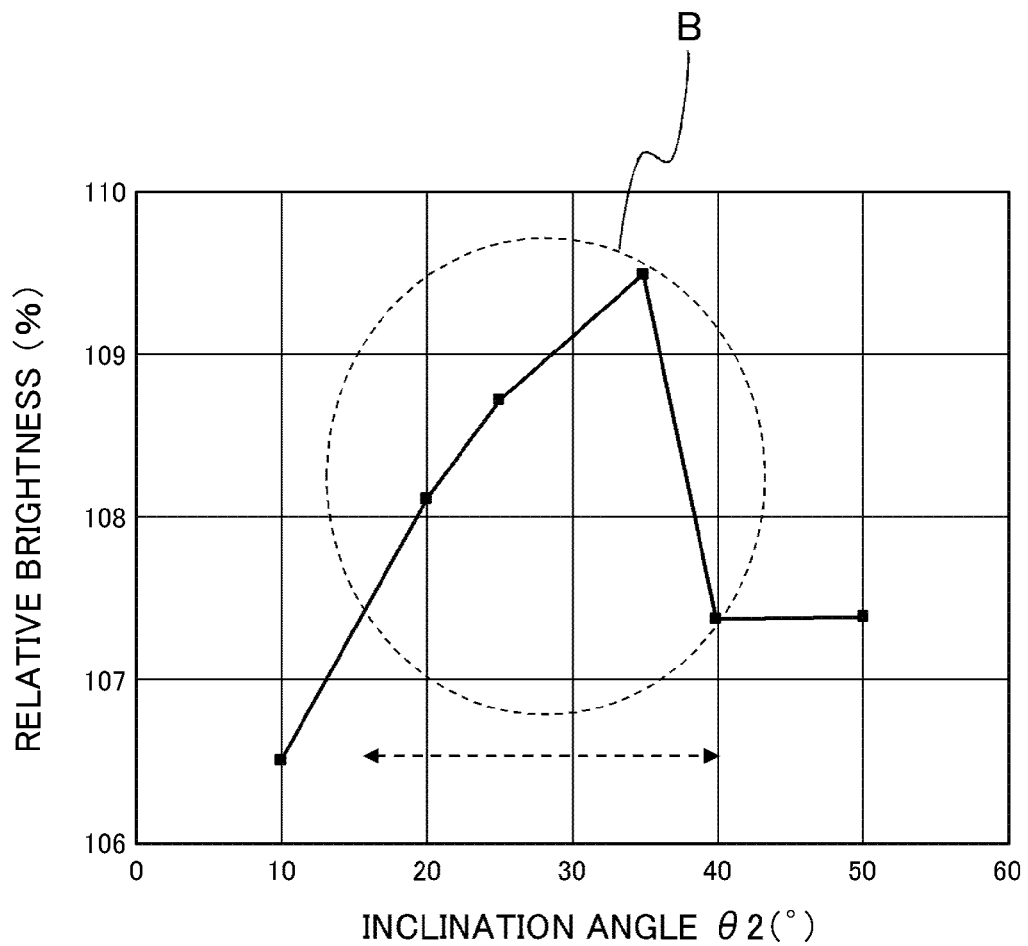
FIG. 14 is a graph illustrating a relationship between brightness and an inclination angle θ2 of an irregularity portion, which is provided parallel to the light traveling direction of the light guide plate of another example of the present invention.

Next, experimental results related to angular dependency of brightness are shown in FIG. 14, concerning the inclination angle of the first side surface 46 of the concave portion or the convex portion (first convex portion 40 in FIG. 2), which is provided parallel to the light traveling direction of the light guide plate.

Figure 15A:
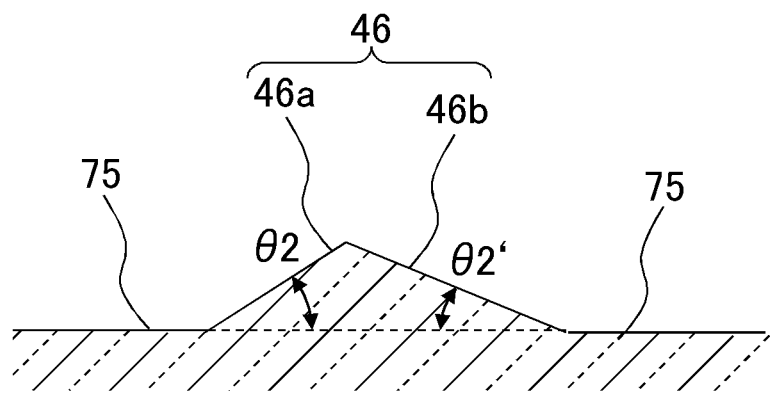
FIGS. 15A and 15B are views each illustrating the inclination angle θ2 of the irregularity portion, which is provided parallel to the light traveling direction of the light guide plate of the another example.
Figure 15B:
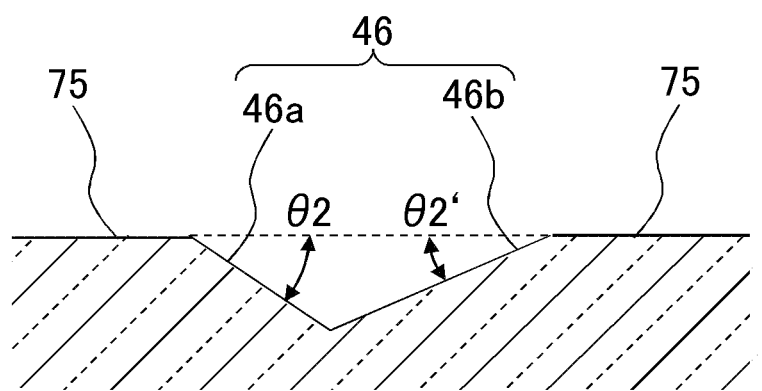

FIG. 15A illustrates an example in which first side surfaces 46a and 46b form a protrusion, and FIG. 15B illustrates an example in which the first side surfaces 46a and 46b form a recess. Note that, as illustrated in FIGS. 15A and 15B, the inclination angles θ2 and θ2' of the first side surfaces 46a and 46b correspond to angles of inclination of the first side surfaces 46a and 46b with respect to the flat region 75 illustrated in FIG. 2, which is surrounded by the plurality of first convex portions 40 and the plurality of second convex portions 42.

The conventional backlight unit uses the light guide plate corresponding to the light guide plate of FIG. 2 without the first convex portions 40, which are provided on the front surface and extend along the light traveling direction. The inclination angle θ1 of the second side surface 50b of the second convex portion 42 in this case was 10°. Therefore, FIG. 14 illustrates a dependency of brightness with respect to the inclination angles θ2 and θ2' (θ2=θ2') of the first side surfaces 46a and 46b of another example of the present invention including the first convex portions 40, in which the inclination angle θ1 of the second side surface 50b is fixed to 5° and the light guide plate without the first convex portions 40, which has the second side surface 50b with the inclination angle θ1 of 10°, is used as a reference. Specifically, the horizontal axis of FIG. 14 represents the inclination angle θ2 (θ2=θ2') of the first side surfaces 46a and 46b of the first convex portion 40 (longitudinal groove), which is provided parallel to the light traveling direction, and the vertical axis of FIG. 14 represents the relative brightness (%) with respect to the reference.

As illustrated in FIG. 14, there is almost no change in brightness when the inclination angle θ2 is 40° or larger. As indicated by a portion surrounded by the broken line B in FIG. 14, the brightness is higher than that of the reference when the inclination angle θ2 is 40° or smaller, and when the inclination angle θ2 is 15° or smaller, the effect of brightness improvement becomes equal to or lower than the reference. Therefore, the preferred range of the inclination angle θ2 of the first side surface 46 to take advantage of the brightness improvement, which is the feature of this example, is 15° to 40°. Note that, as illustrated in FIGS. 15A and 15B, the first side surfaces 46a and 46b may be shaped asymmetrically, and the condition of θ2=θ2' is not necessarily important for the brightness improvement. The ranges of the inclination angles θ2 and θ2' may be in the range of 15° to 40°, independently.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
  a light source;
  a light guide plate comprising a front surface, a rear surface on a side opposite to the front surface, and an edge surface connecting the front surface and the rear surface to each other, the light guide plate being arranged so that the edge surface is opposed to the light source, the light guide plate being configured to internally reflect light entering from the edge surface to cause planar light emission from the front surface;
  a light shutter type display panel, which is arranged so as to be opposed to the front surface of the light guide plate, and in which passing and blocking of the light exiting from the front surface of the light guide plate is controlled to display an image; and
  a reflective sheet arranged so as to be opposed to the rear surface of the light guide plate, wherein:
  the front surface of the light guide plate has irregularities formed thereon;
  the irregularities of the front surface of the light guide plate are formed to have a shape of a combination of a plurality of first convex portions and a plurality of second convex portions, each of the plurality of first convex portions comprising a first ridge line which continuously extends along a first direction corresponding to a traveling direction of the light, each of the plurality of second convex portions comprising a second ridge line which continuously extends along a second direction intersecting the first direction;
  a pitch of the first convex portions is substantially constant;
  a pitch of the second convex portions is substantially constant; and
  the second convex portions vary in height with respect to a height of the first convex portions so that some of the second convex portions have a first height and others of the second convex portions have a different second height with respect to the height of the first convex portions so as to enable adjustment of a light distribution of light exiting the front surface of the light guide plate.

2. The display device according to claim 1, wherein:
  the each of the plurality of second convex portions comprises a pair of second side surfaces, which are inclined from the second ridge line in directions opposite to each other; and
  one second side surface of the pair of second side surfaces, which is located on a side on which the light enters, and another second side surface thereof, which is located on a side opposite to the one second side surface, are formed so that the another second side surface is inclined at an angle smaller than an angle of the one second side surface.

3. The display device according to claim 1, wherein regions surrounded by the plurality of first convex portions and the plurality of second convex portions are flat.

4. The display device according to claim 1, wherein the reflective sheet comprises an enhanced specular reflector.

5. The display device according to claim 4, wherein the rear surface of the light guide plate comprises a rough surface.

6. The display device according to claim 1, wherein:
  the rear surface comprises a plurality of third convex portions each comprising a third ridge line which continuously extends along the first direction; and
  each of the plurality of third convex portions comprises a pair of third side surfaces provided across the third ridge line.

7. The display device according to claim 1, wherein the rear surface comprises a plurality of concave portions each extending along the first direction.

8. The display device according to claim 1, wherein the light guide plate comprises a portion of one of a concave portion and a convex portion, which is provided perpendicular to the light traveling direction of the light guide plate, the portion being inclined at a small angle and having an inclination angle in a vicinity of a range of 2° to 5°.

9. The display device according to claim 1, wherein the light guide plate comprises an inclined portion of one of a concave portion and a convex portion, which is provided parallel to the light traveling direction of the light guide plate, the inclined portion having an inclination angle in a range of 15° to 40°.

10. A display device, comprising:
  a light source;

a light guide plate comprising a front surface, a rear surface on a side opposite to the front surface, and an edge surface connecting the front surface and the rear surface to each other, the light guide plate being arranged so that the edge surface is opposed to the light source, the light guide plate being configured to internally reflect light entering from the edge surface to cause planar light emission from the front surface;

a light shutter type display panel, which is arranged so as to be opposed to the front surface of the light guide plate, and in which passing and blocking of the light exiting from the front surface of the light guide plate is controlled to display an image; and a reflective sheet arranged so as to be opposed to the rear surface of the light guide plate, wherein:

the front surface of the light guide plate has irregularities formed thereon;

the irregularities of the front surface of the light guide plate are formed to have a shape of a combination of a plurality of first concave portions and a plurality of second concave portions, each of the plurality of first concave portions comprising a first valley line which continuously extends along a first direction corresponding to a traveling direction of the light, each of the plurality of second concave portions comprising a second valley line which continuously extends along a second direction intersecting the first direction;

a pitch of the first concave portions is substantially constant;

a pitch of the second concave portions is substantially constant; and the second concave portions vary in depth with respect to a depth of the first concave portions so that some of the second concave portions have a first depth and others of the second concave portions have a different second depth with respect to the depth of the first concave portions so as to enable adjustment of a light distribution of light exiting the front surface of the light guide plate.

11. The display device according to claim 10, wherein:

the each of the plurality of second concave portions comprises a pair of second side surfaces, which are inclined from the second valley line in directions opposite to each other; and one second side surface of the pair of second side surfaces, which is located on a side on which the light enters, and another second side surface thereof, which is located on a side opposite to the one second side surface, are formed so that the one second side surface is inclined at an angle smaller than an angle of the another second side surface.

12. The display device according to claim 10, wherein regions surrounded by the plurality of first concave portions and the plurality of second concave portions are flat.

13. The display device according to claim 10, wherein the reflective sheet comprises an enhanced specular reflector.

14. The display device according to claim 13, wherein the rear surface of the light guide plate comprises a rough surface.

15. The display device according to claim 10, wherein:

the rear surface comprises a plurality of convex portions each comprising a ridge line which continuously extends along the first direction; and each of the plurality of convex portions comprises a pair of side surfaces provided across the ridge line.

16. The display device according to claim 10, wherein the rear surface comprises a plurality of third concave portions each extending along the first direction.

17. The display device according to claim 10, wherein the light guide plate comprises a portion of one of a concave portion and a convex portion, which is provided perpendicular to the light traveling direction of the light guide plate, the portion being inclined at a small angle and having an inclination angle in a vicinity of a range of 2° to 5°.

18. The display device according to claim 10, wherein the light guide plate comprises an inclined portion of one of a concave portion and a convex portion, which is provided parallel to the light traveling direction of the light guide plate, the inclined portion having an inclination angle in a range of 15° to 40°.

19. The display device according to claim 1, wherein the first height of some of the second convex portions is smaller than the height of the first convex portions and the different second height of the others of the second convex portions is larger than the height of the first convex portions, and the light distribution of light exiting the front surface of the light guide plate is uniform.

20. The display device according to claim 10, wherein the first depth of some of the second concave portions, and is smaller than the depth of the first concave portions and the different second depth of the others of the second concave portions is larger than the depth of the first concave portions, and the light distribution of light exiting the front surface of the light guide plate is uniform.

* * * * *